United States Patent
King

(10) Patent No.: US 12,169,036 B2
(45) Date of Patent: Dec. 17, 2024

(54) FLEXIBLE U-BOLT ASSEMBLY

(71) Applicant: CTKing, LLC, Berea, KY (US)

(72) Inventor: Paul King, Berea, KY (US)

(73) Assignee: CTKing, LLC, Berea, KY (US)

( * ) Notice: Subject to any disclaimer, the term of this patent is extended or adjusted under 35 U.S.C. 154(b) by 0 days.

(21) Appl. No.: 18/018,743

(22) PCT Filed: Jul. 29, 2021

(86) PCT No.: PCT/US2021/043714
§ 371 (c)(1),
(2) Date: Jan. 30, 2023

(87) PCT Pub. No.: WO2022/026718
PCT Pub. Date: Feb. 3, 2022

(65) Prior Publication Data
US 2023/0296193 A1  Sep. 21, 2023

Related U.S. Application Data

(60) Provisional application No. 63/058,157, filed on Jul. 29, 2020.

(51) Int. Cl.
*F16L 3/10* (2006.01)
*F16L 3/237* (2006.01)

(52) U.S. Cl.
CPC .......... *F16L 3/1058* (2013.01); *F16L 3/1041* (2013.01); *F16L 3/237* (2013.01)

(58) Field of Classification Search
CPC ....... F16L 3/1058; F16L 3/1041; F16L 3/237; F16L 3/1091; F16L 3/233; F01N 2450/18; F01N 13/1822; F01N 13/1855; F01N 13/1872; F16B 7/0433

USPC ........................................................ 248/74.3
See application file for complete search history.

(56) References Cited

U.S. PATENT DOCUMENTS

| | | | | |
|---|---|---|---|---|
| 684,084 | A * | 10/1901 | Mueller | F16L 41/06 |
| | | | | 285/199 |
| 1,828,287 | A | 10/1931 | MacBean | |
| 2,748,803 | A | 6/1956 | Guarnaschelli | |
| 3,199,815 | A * | 8/1965 | Martinkovic | F16L 25/04 |
| | | | | 248/62 |
| 3,428,372 | A | 2/1969 | Keller et al. | |
| 3,591,211 | A | 7/1971 | Richey | |
| 4,010,504 | A * | 3/1977 | Griffin | E05D 7/04 |
| | | | | 16/252 |
| 4,079,481 | A * | 3/1978 | Cacicedo | E05D 7/04 |
| | | | | 16/253 |

(Continued)

FOREIGN PATENT DOCUMENTS

| EP | 1698496 | 9/2006 |
|---|---|---|
| GB | 2024358 | 1/1980 |

OTHER PUBLICATIONS

Machine Translation of EP1698496, Google Patents, date retrieved Jun. 29, 2023.

*Primary Examiner* — Muhammad Ijaz
(74) *Attorney, Agent, or Firm* — Warren D. Schickli; Stites & Harbison PLLC

(57) ABSTRACT

A flexible U-bolt assembly includes a clamping bracket including a receiver and a U-bolt including (a) a first end fixed to the clamping bracket, (b) a second end adapted for receipt in the receiver and (c) a flexible elongated body extending between the first end and the second end.

14 Claims, 15 Drawing Sheets

(56) References Cited

U.S. PATENT DOCUMENTS

| | | | |
|---|---|---|---|
| 4,372,017 A | 2/1983 | Heckethorn | |
| 4,489,463 A * | 12/1984 | Schafer | F01N 13/1805 24/20 R |
| 4,506,418 A * | 3/1985 | Viola | F01N 13/1855 24/284 |
| 4,611,946 A | 9/1986 | Gebelius | |
| 4,690,443 A | 9/1987 | Brammall | |
| 4,730,960 A | 3/1988 | Lewis et al. | |
| 5,020,192 A * | 6/1991 | Gerlach | F16G 11/14 24/129 R |
| 5,076,526 A | 12/1991 | Zane et al. | |
| 5,147,145 A | 9/1992 | Facey et al. | |
| 5,718,403 A * | 2/1998 | Ott | F16B 2/065 248/219.4 |
| 5,791,022 A * | 8/1998 | Bohman | F16G 11/103 24/130 |
| 6,003,210 A | 12/1999 | Facey et al. | |
| 6,058,574 A | 5/2000 | Facey et al. | |
| 6,513,403 B2 | 2/2003 | Yatskov | |
| 6,908,275 B2 | 6/2005 | Nelson | |
| D523,738 S | 6/2006 | Henson | |
| 7,063,299 B2 | 6/2006 | Facey et al. | |
| 7,100,238 B2 | 9/2006 | McCauley | |
| 7,235,090 B2 | 6/2007 | Buckman, Jr. et al. | |
| 7,249,923 B2 | 7/2007 | Niku | |
| D567,641 S | 4/2008 | Clarke | |
| D568,730 S | 5/2008 | Clarke | |
| D574,701 S | 8/2008 | Clarke | |
| D579,411 S | 10/2008 | Jowett | |
| D604,148 S | 11/2009 | Clarke | |
| D626,820 S | 11/2010 | Boaler et al. | |
| D637,068 S | 5/2011 | Peart | |
| D639,151 S | 6/2011 | Giemza | |
| D651,069 S | 12/2011 | Peart | |
| 8,114,124 B2 | 2/2012 | Buckman et al. | |
| D684,844 S | 6/2013 | Ferreira | |
| D696,929 S | 1/2014 | Bacon | |
| 8,727,015 B1 | 5/2014 | Oddo | |
| D723,362 S | 3/2015 | Bacon | |
| D732,376 S | 6/2015 | Somerfield | |
| D736,420 S | 8/2015 | Somerfield | |
| D740,631 S | 10/2015 | Bacon | |
| 9,155,538 B2 | 10/2015 | Buckman, Jr. et al. | |
| D745,699 S | 12/2015 | Clarke | |
| D745,822 S | 12/2015 | Somerfield | |
| 9,498,671 B1 * | 11/2016 | Softky | A63B 22/02 |
| 9,624,639 B2 | 4/2017 | Somerfield | |
| 9,695,908 B2 | 7/2017 | Somerfield | |
| D805,378 S | 12/2017 | Somerfield | |
| 9,840,808 B2 | 12/2017 | Facey | |
| D820,723 S | 6/2018 | Giemza | |
| D833,857 S | 11/2018 | Giemza et al. | |
| D840,200 S | 2/2019 | Giemza | |
| D845,092 S | 4/2019 | Giemza | |
| 10,316,877 B2 | 6/2019 | Chapman et al. | |
| D854,398 S | 7/2019 | Davis | |
| D854,920 S | 7/2019 | Fisher | |
| D854,921 S | 7/2019 | Fisher | |
| D869,262 S | 12/2019 | Davis | |
| D875,513 S | 2/2020 | Fisher | |
| D880,995 S | 4/2020 | Giemza | |
| 10,631,472 B2 | 4/2020 | Clarke et al. | |
| 10,883,569 B2 | 1/2021 | Giemza | |
| 10,914,333 B2 | 2/2021 | Davis | |
| 10,954,666 B2 | 3/2021 | Somerfield | |
| D923,465 S | 6/2021 | Davis | |
| D928,601 S | 8/2021 | Reynolds | |
| 11,215,320 B2 | 1/2022 | Somerfield | |
| 11,221,056 B2 | 1/2022 | Davis | |
| 11,396,959 B2 | 7/2022 | Reynolds | |
| D969,168 S | 11/2022 | Davis et al. | |
| 11,536,000 B2 | 12/2022 | Giemza et al. | |
| 2010/0038611 A1 | 2/2010 | Lambourn et al. | |
| 2010/0229698 A1 | 9/2010 | Shawcross et al. | |
| 2010/0279540 A1 | 11/2010 | Shawcross et al. | |
| 2013/0160245 A1 | 6/2013 | Ferreira | |
| 2013/0291341 A1 | 11/2013 | Somerfield et al. | |
| 2014/0037387 A1 | 2/2014 | Ferreira et al. | |
| 2014/0123439 A1 | 5/2014 | Bacon | |
| 2015/0176726 A1 | 6/2015 | Bacon | |
| 2016/0089727 A1 | 3/2016 | Bostock et al. | |
| 2017/0218593 A1 | 8/2017 | Butterworth et al. | |
| 2017/0314597 A1 | 11/2017 | Somerfield | |
| 2023/0296193 A1 * | 9/2023 | King | F16L 3/233 248/74.3 |

* cited by examiner

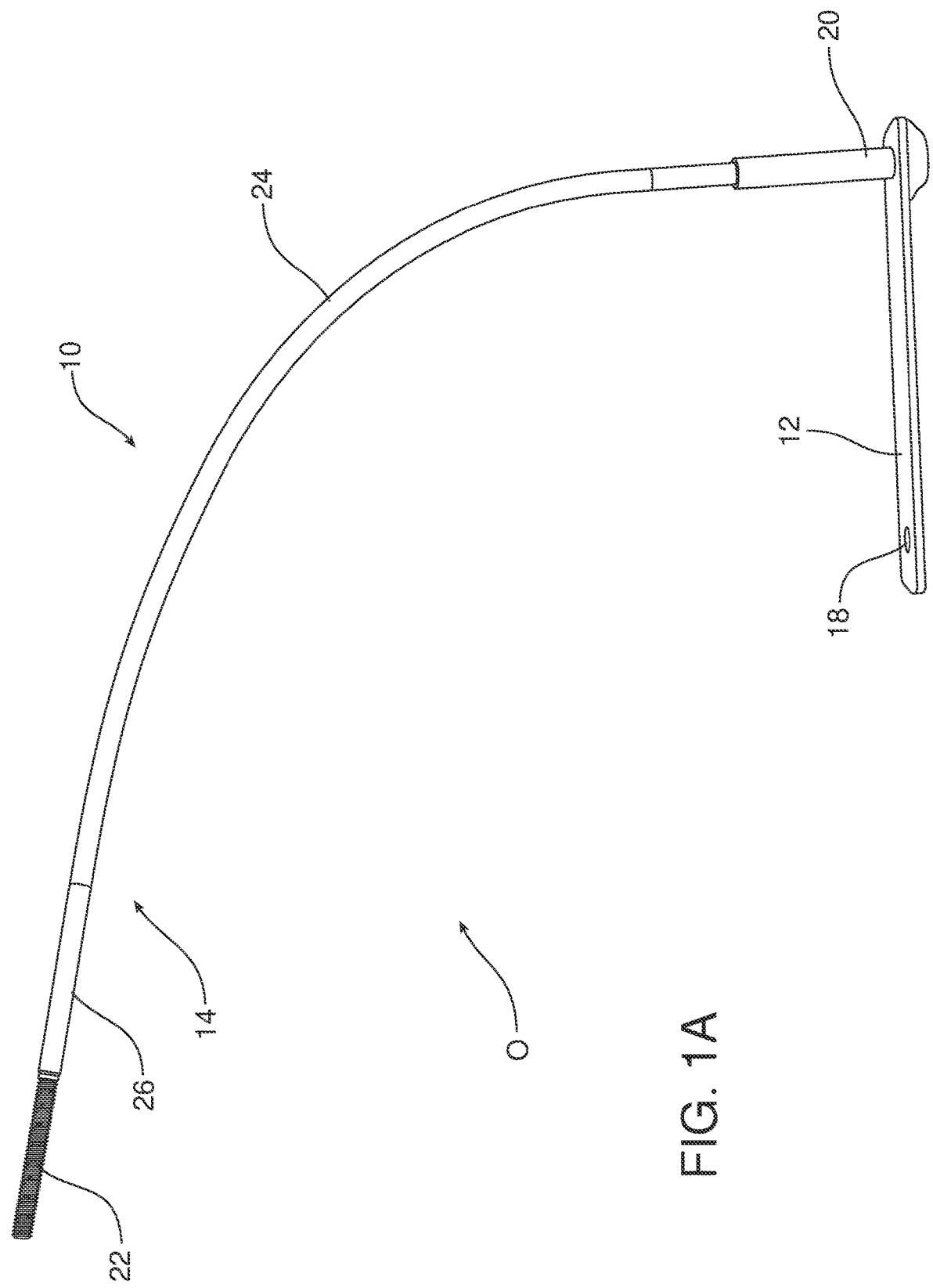

FLEXIBLE U-BOLT ASSEMBLY

RELATED APPLICATIONS

This application claims priority to International Patent Application No. PCT/US2021/043714, filed Jul. 29, 2021, the entirety of the contents of which is incorporated by reference herein, which claims priority to U.S. Provisional Patent App. No. 63/058,157, filed Jul. 29, 2020, the entirety of the contents of which is incorporated by reference herein.

TECHNICAL FIELD

This document relates generally to the field of connecting devices and, more particularly, to a new and improved flexible U-bolt assembly having great versatility for a nearly infinite number of different applications.

BACKGROUND

This document relates to a new and improved U-bolt assembly including a flexible elongated body capable of at least partially conforming to the shape of the workpieces, objects or elements to be connected together. This allows the flexible U-bolt to better grip and hold the workpieces or elements together. The new and improved U-bolt assembly has a wider range of uses than state of the art U-bolts with rigid U-shaped bolts. The new and improved U-bolt is useful to: (a) temporarily retain workpieces together until they can be fastened by other means such as welding or brazing, (b) semi-permanently or permanently secure workpieces, objects or other structures together, (c) hang pipes or other elements from an overlying structural support such as a rafter, beam or ceiling joist and (d) hang various automotive components including exhaust system, hoses and lines and fasten them to the vehicle frame.

SUMMARY

In accordance with the purposes and benefits set forth herein, a new and improved flexible U-bolt assembly is provided. That flexible U-bolt assembly may comprise, consist or consist essentially of (1) a clamping bracket, including a receiver, and (2) a U-bolt including (a) a first end fixed to the clamping bracket, (b) a second end adapted for receipt in the receiver and (c) a flexible elongated body extending between the first end and the second end.

In one or more of the many possible embodiments of the flexible U-bolt assembly, the flexible U-bolt assembly further includes a fastener adapted to secure the second end to the receiver. That second end may include a threaded shank and the fastener may be a lock nut.

The receiver may assume any number of different configurations including, but not necessarily limited to, an aperture provided in the clamping bracket, a plurality of spaced apertures provided in the clamping bracket, and an elongated slot provide in the clamping bracket. That elongated slot may be a simple elongated slot or an elongated slot including an entry aperture adapted to receive the second end of the U-bolt and a neck portion interconnecting the entry aperture to at least one locking aperture adapted to capture and hold the second end.

In one or more of the many possible embodiments of the flexible U-bolt assembly, the second end includes a connector having an enlarged head adapted to pass through the entry aperture and be captured in the at least one locking aperture. In other embodiments of the flexible U-bolt assembly, the second end may include a plurality of connectors, each of the plurality of connectors including an enlarged head adapted to pass through the entry aperture and be captured in the at least one locking aperture. In this way, the length of the U-bolt may be adjusted thereby allowing use for a wider range of applications.

In one or more of the many possible embodiments, the clamping bracket is a rigid steel plate. In one or more of the many possible embodiments, the flexible elongated body is a line, a rope or a cable made from a natural fiber, kenaf, cotton, a plastic material, a composite material, a metal or steel.

In one or more embodiments of the flexible U-bolt assembly, the flexible elongated body includes a first section and a second section connected together by a section connecter whereby the overall length of the elongated body may be adjusted to meet the needs of a particular application.

In accordance with an additional aspect, the flexible U-bolt assembly may comprise, consist or consist essentially of (1) a clamping bracket including a first receiver and a second receiver and (2) a U-bolt including (a) a first end adapted for receipt in the first receiver, (b) a second end adapted for receipt in the second receiver and (c) a flexible elongated body extending between the first end and the second end.

In one or more embodiments, the flexible U-bolt further includes a first fastener adapted to secure the first end in the first receiver and a second fastener adapted to secure the second end in the second receiver. The first receiver may comprise a first aperture provided in the clamping bracket. The second receiver may comprise a second aperture provided in the clamping bracket.

In some embodiments, the second receiver may comprise a plurality of spaced apertures provided in the clamping bracket. In some embodiments, the second receiver may comprise an elongated slot provided in the clamping bracket.

In some embodiments, the elongated slot may have an entry aperture adapted to receive the second end and a neck portion interconnecting the entry aperture to at least one locking aperture adapted to capture the second end. In some embodiments, the second end includes a connector having an enlarged head adapted to pass through the entry aperture and be captured in the at least one locking aperture. In other embodiments, the second end may include a plurality of connectors, each of the plurality of connectors having an enlarged head adapted to pass through the entry aperture and be captured in the at least one locking aperture.

In still other embodiments, the flexible elongated body includes a first section and a second section connected together by a section connecter whereby a length of the elongated body may be adjusted.

In accordance with still another aspect, the flexible U-bolt may comprise, consist or consist essentially of: (a) an elongated, flexible elongated body, (b) a receiver carried on a first end of the elongated body and (c) a locking element carried on a second end of the elongated body, the locking element adapted to be received and held by the receiver.

In one or more embodiments, the first end is a threaded shank and the second end is a ring received over the threaded shank. The flexible U-bolt assembly may further include a first lock nut for securing the ring to the threaded shank. In other possible embodiments, the flexible U-bolt may further include a first lock nut and a second lock nut adapted to secure the ring to the threaded shank between the first lock nut and the second lock nut.

In some embodiments, the first end may be a split ring having an entry slot and the second end may be a connector having a neck and an enlarged head wherein the neck is adapted for receipt in the split ring and the enlarged head is too large to be received in the split ring. In some embodiments, the elongated flexible elongated body is sized to pass through the entry slot while the neck is too large to pass through the entry slot.

In the following description, there are shown and described several preferred embodiments of the new and improved flexible U-bolt assembly. As it should be realized, the flexible U-bolt assembly is capable of other, different embodiments and its several details are capable of modification in various, obvious aspects all without departing from the flexible U-bolt assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the flexible U-bolt and together with the description serve to explain certain principles thereof.

FIG. 1A is a perspective view of a first possible embodiment of the flexible U-bolt assembly illustrated with the second end disconnected from the receiver in the clamping bracket.

Figure 4A:
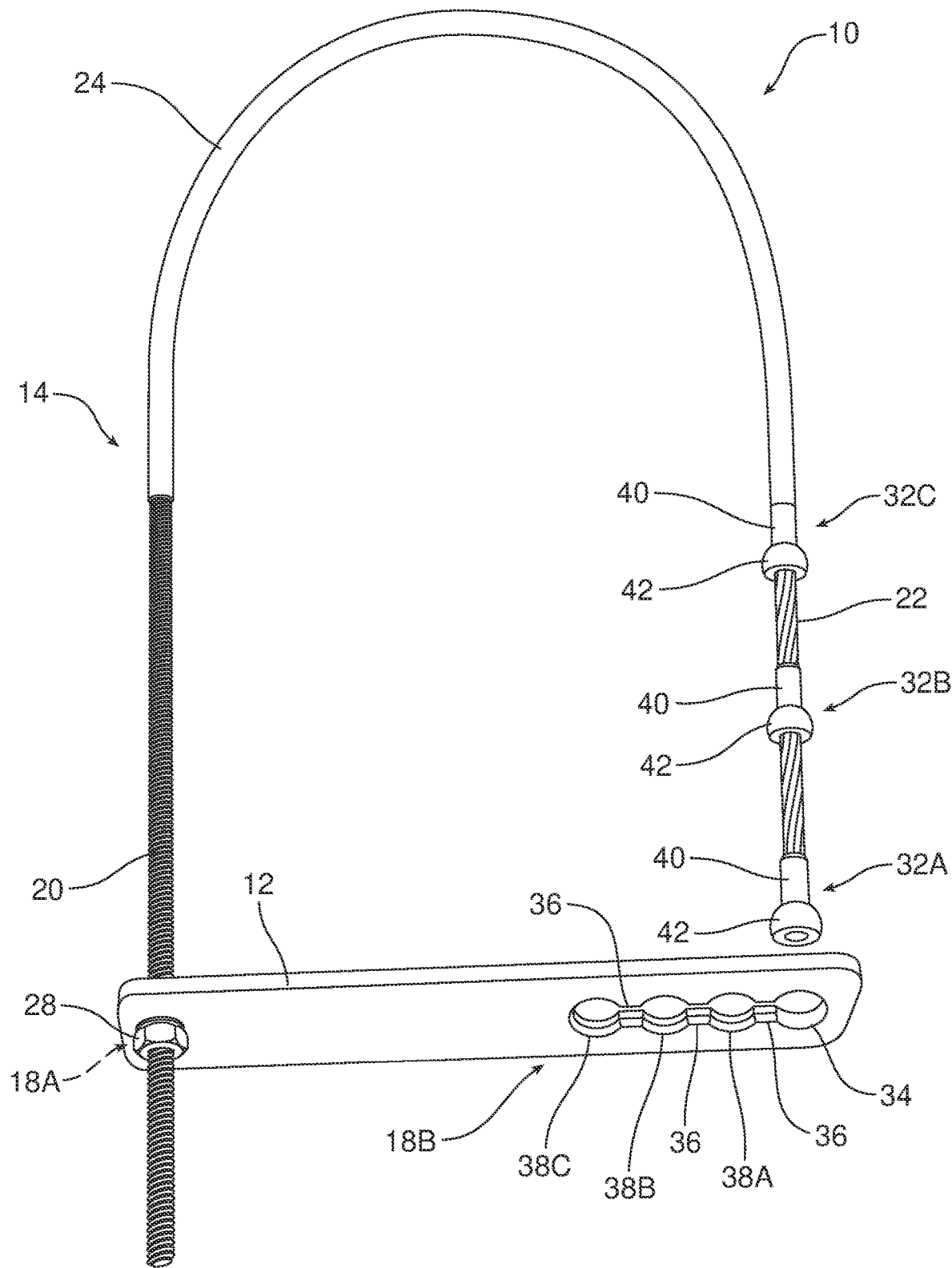
Figure 4B:
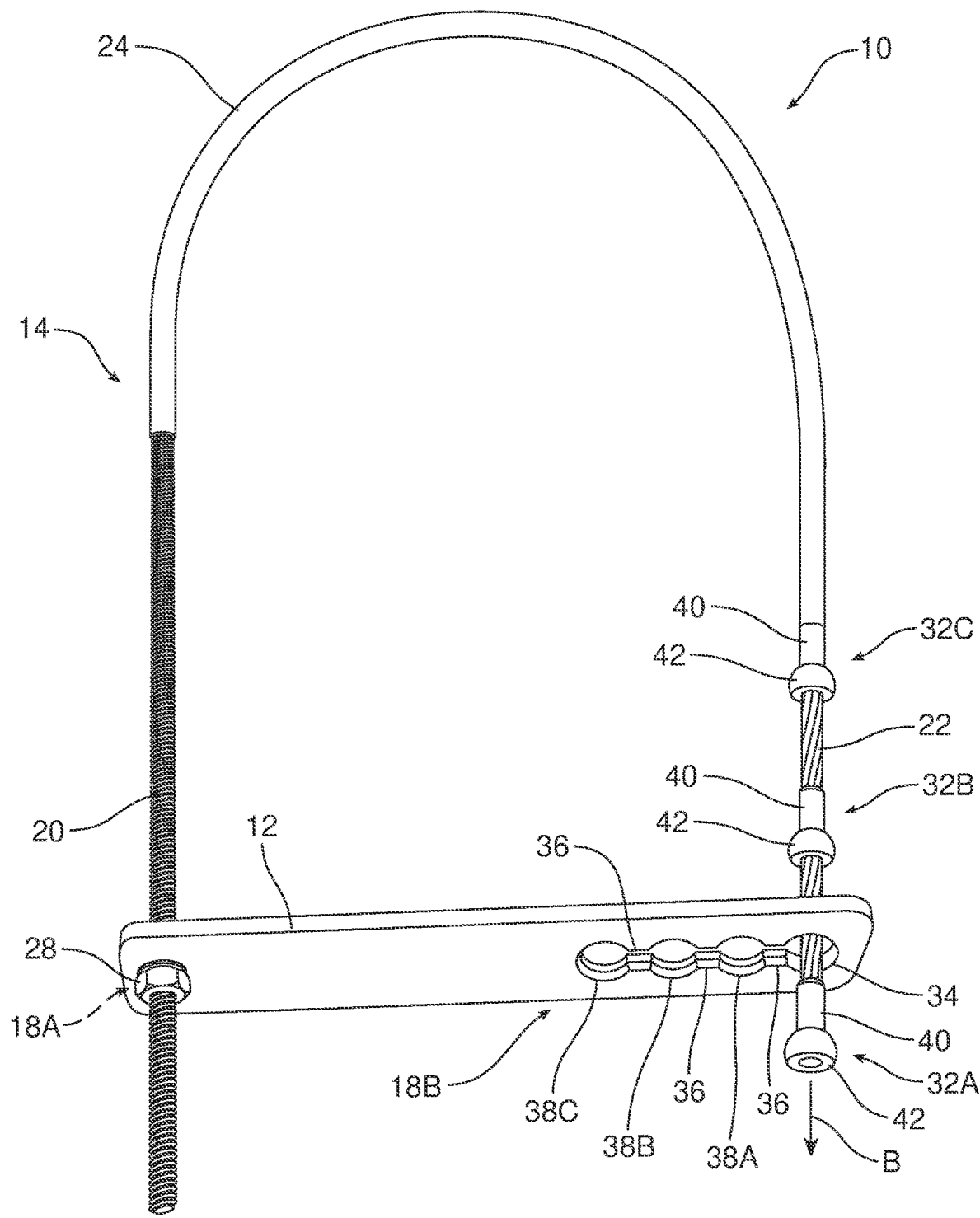
Figure 4C:
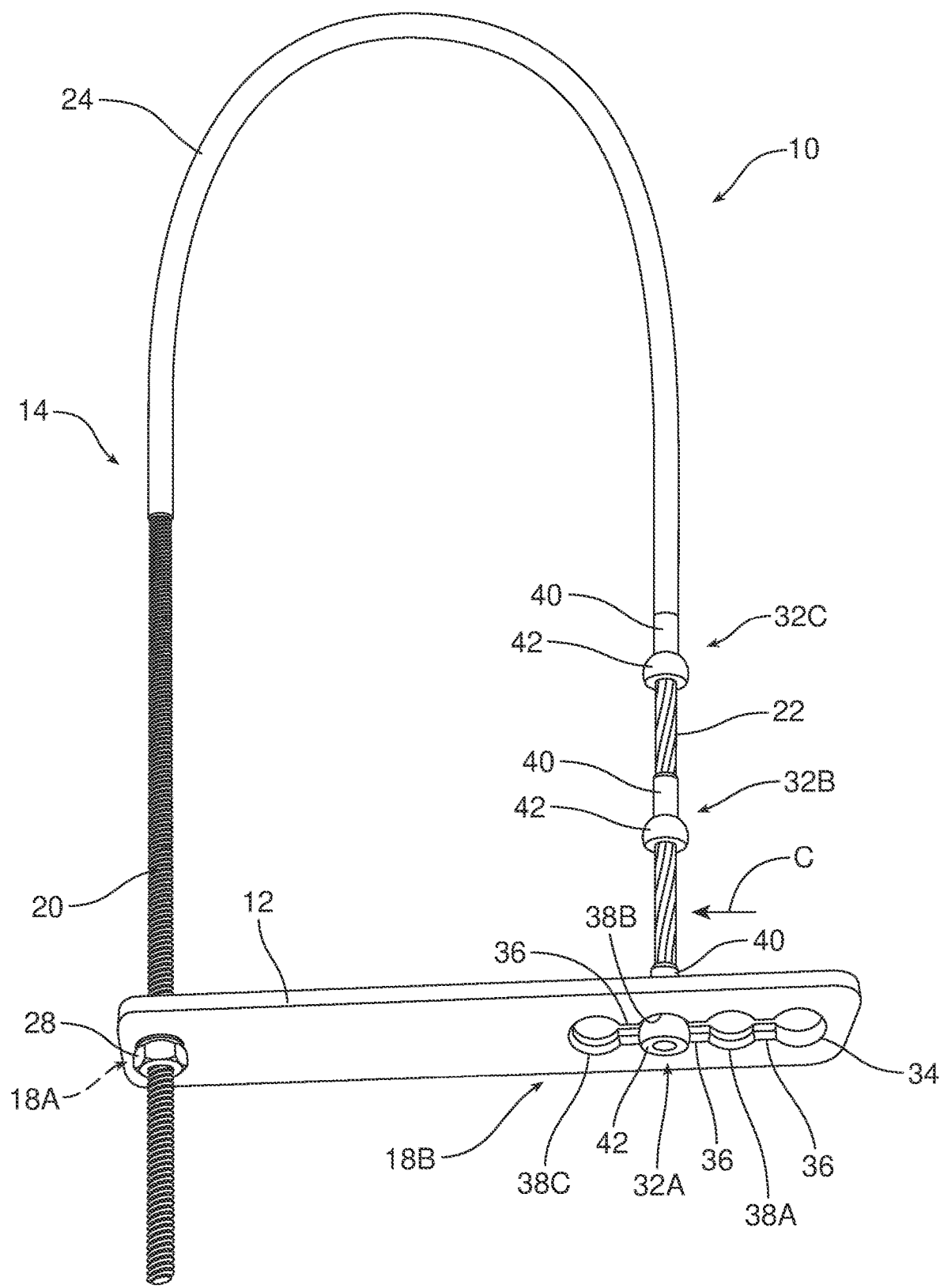

FIGS. 4A-4C illustrate yet another possible embodiment of the flexible U-bolt assembly wherein the first end comprises a threaded shank and the second end comprises a plurality of connectors received in a receiver/elongated slot that includes an entry slot and a neck connecting the entry aperture with a plurality of locking apertures. FIG. 4A illustrates how the second end is aligned with the entry aperture. FIG. 4B illustrates how the second end is inserted through the entry aperture. FIG. 4C illustrates (a) how the connector is shifted along the receiver to one of the locking apertures and (b) the enlarged head of the connector is captured by the locking aperture.

Figure 5:
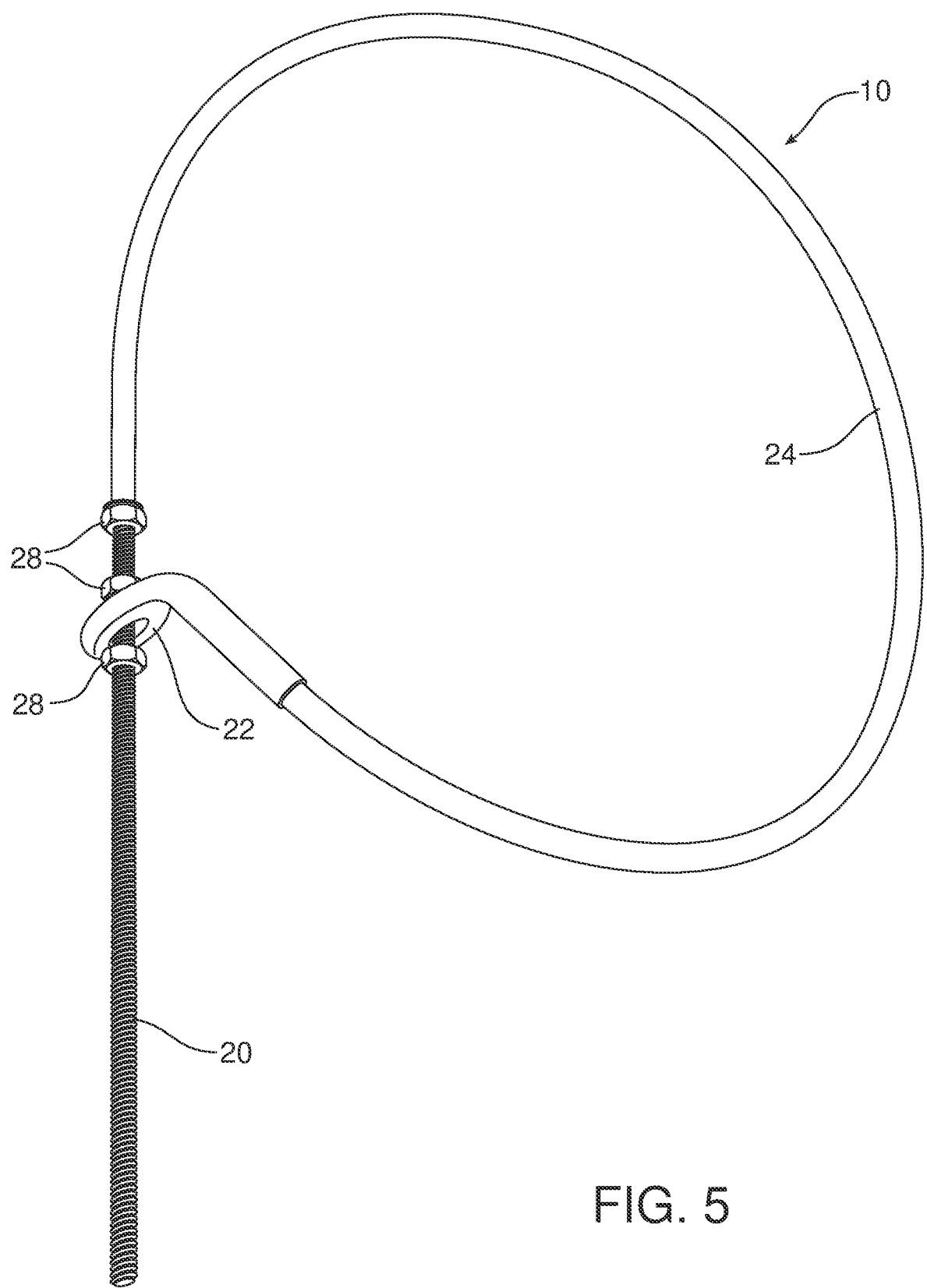

FIG. 5 illustrates yet another embodiment of the flexible U-bolt assembly wherein the first end of the U-bolt comprises a threaded shank and the second end of the U-bolt comprises a locking ring.

Figure 6A:
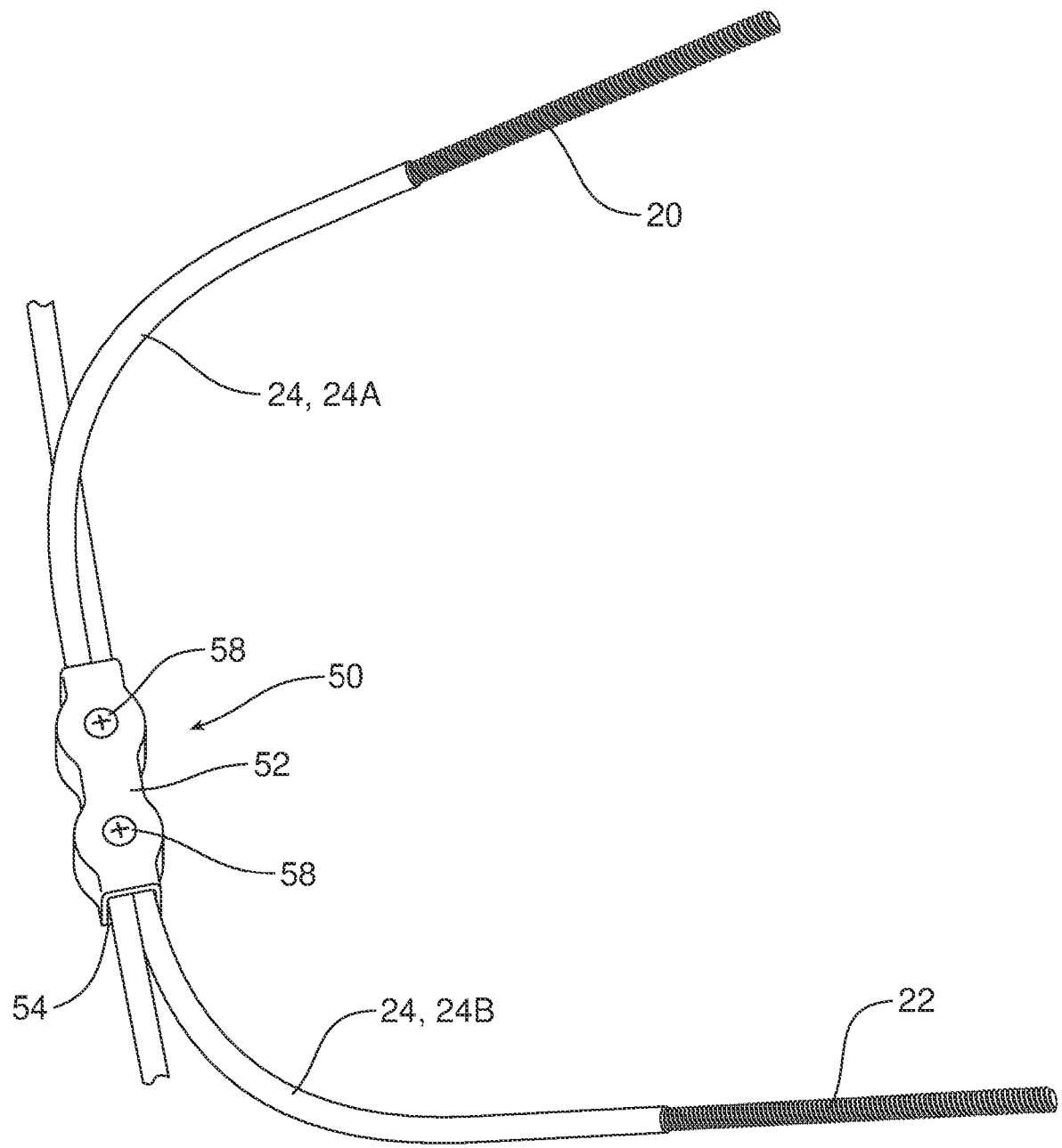
Figure 6B:
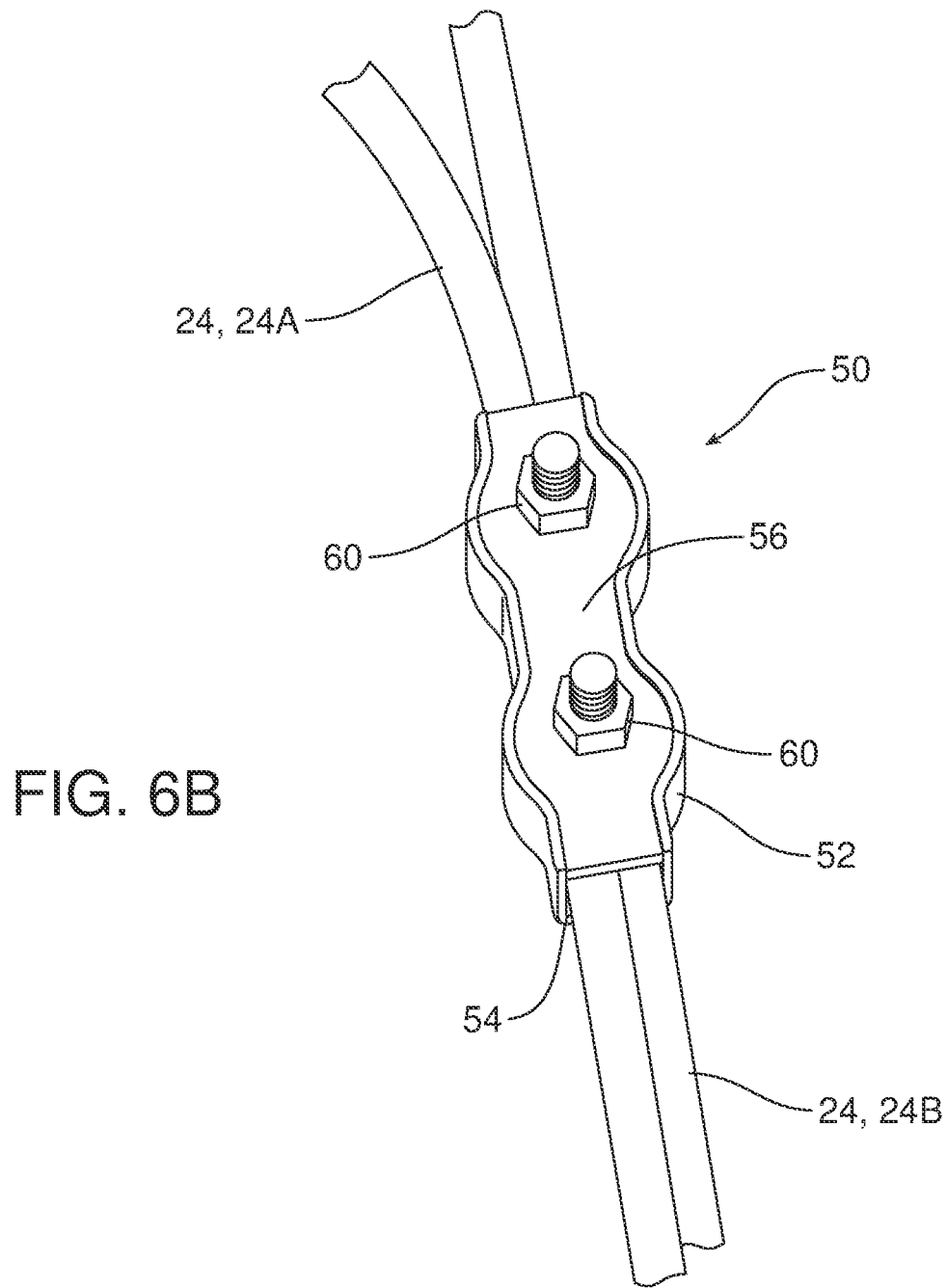

FIG. 6A is a perspective view illustrating an embodiment of the flexible U-bolt assembly wherein the flexible elongated body of the U-bolt assembly includes two sections joined together by a section connector. FIG. 6B is a detailed view of that section connector.

Figure 7:
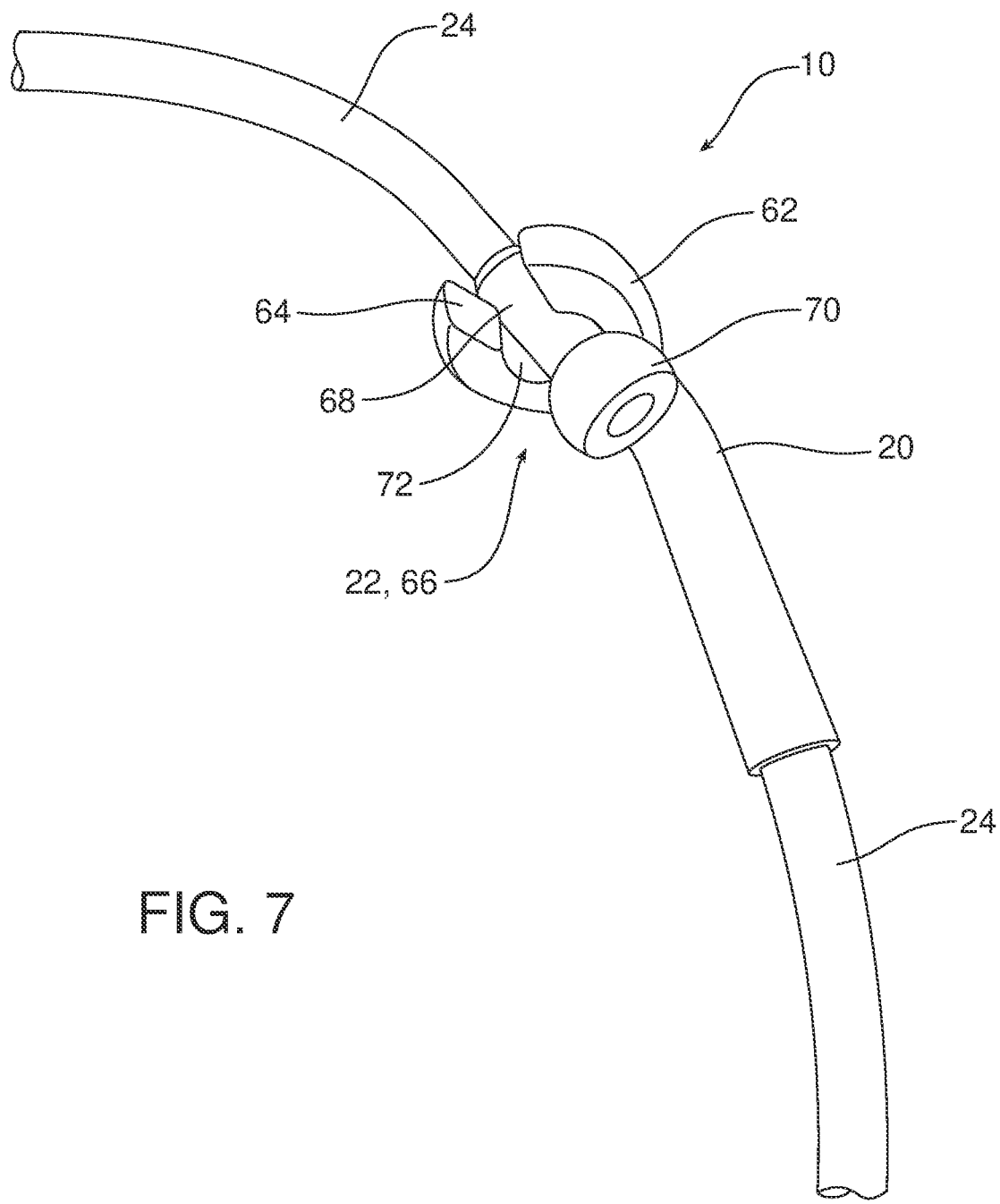

FIG. 7 is yet another embodiment of the flexible U-bolt assembly wherein the first end of the elongated flexible body is a split ring having an entry slot and the second end of the flexible elongated body is a connector having a neck and an enlarged head.

Reference will now be made in detail to the present preferred embodiments of the apparatus and method, examples of which are illustrated in the accompanying drawing figures.

DETAILED DESCRIPTION

Figure 1B:
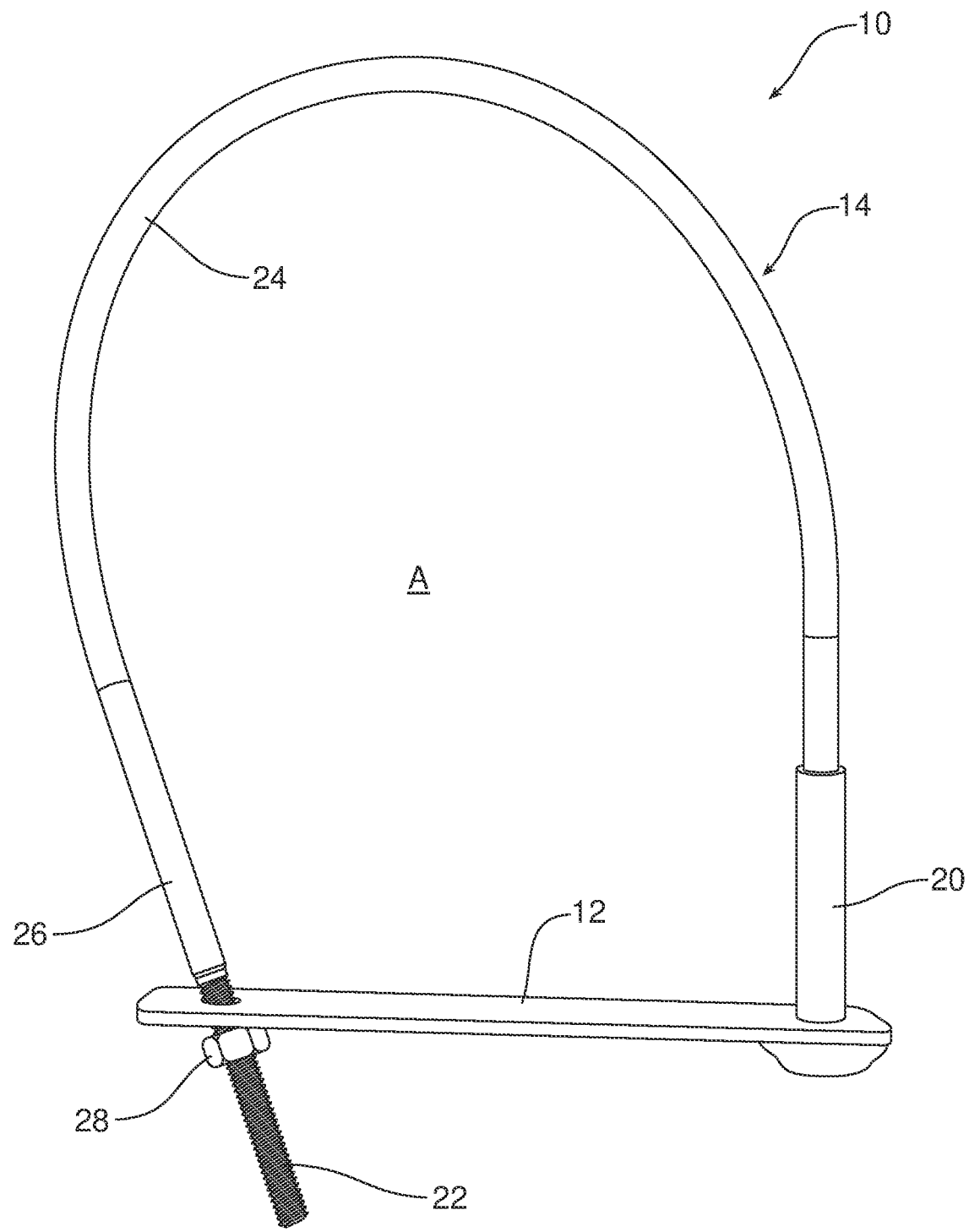
FIG. 1B is a view of the flexible U-bolt assembly of FIG. 1A but with the second end loosely secured in the receiver in the clamping bracket.

Reference is now made to FIGS. 1A and 1B which illustrate a first possible embodiment of the flexible U-bolt assembly 10. As illustrated, the flexible U-bolt assembly includes a clamping bracket 12 and a U-bolt 14. More specifically, the clamping bracket 12 includes a receiver 18 in the form of a single aperture provided in the clamping bracket. The U-bolt 14 includes: (a) a first end 20 fixed to the clamping bracket 12, (b) a second end 22 adapted for receipt in the receiver 18 and (c) a flexible elongated body 24 extending between the two ends.

The clamping bracket 12 may take any appropriate form for clamping two or more workpieces (not shown in FIGS. 1A and 1B) together in cooperation with the U-bolt 14. In the illustrated embodiment, the clamping bracket 12 is a rigid steel plate. Of course, such a plate could be made from other materials including, but not necessarily limited to other metals, such as aluminum, plastics, such as polycarbonate, nylon or acrylonitrile-butadiene-styrene copolymer (ABS), and various composite materials, such as glass fiber reinforced nylon.

The flexible elongated body 14 may comprise a line, a rope or a cable made from a natural fiber, kenaf, cotton, a plastic material, a composite material, a metal or steel. The length of the flexible elongated body may vary depending upon the particular application. Common lengths for most applications range from as little as 5.0 cm to 1 meter or more. The flexible elongated body may have a circular cross section as shown in FIGS. 1A and 1B but it should be appreciated that different cross section shapes may be provided including those that might be suited for a special application.

In the embodiment illustrated in FIGS. 1A and 1B, the flexible elongated body 24 is a steel cable and the first end 20 is a metal sleeve that is (a) received over and crimped to a first end portion of the flexible elongated body 24 and (b) welded to one end of the clamping bracket 12 to provide a permanent connection. The second end 22 is a threaded shank connected to the elongated body by a connecting sleeve 26 that is received around a second end portion of the flexible elongated body and then crimped thereto in order to secure the threaded shank in position.

FIG. 1A illustrates the second end 22 free of the clamping bracket 12 in order to provide an opening O allowing the U-bolt assembly 10 to be positioned around a workpiece or other element (not shown). FIG. 1B illustrates the second end 22 loosely secured in the receiver 18 of the clamping bracket 12 by means of a fastener/lock nut 28 partially tightened onto the second end/threaded shank. The enclosed area A defined within the clamp 12 and U-bolt 14 will hold one or more workpieces or other elements (not shown) as desired for any particular application. By tightening the fastener 28 a snug fit may be provided.

Figure 2:
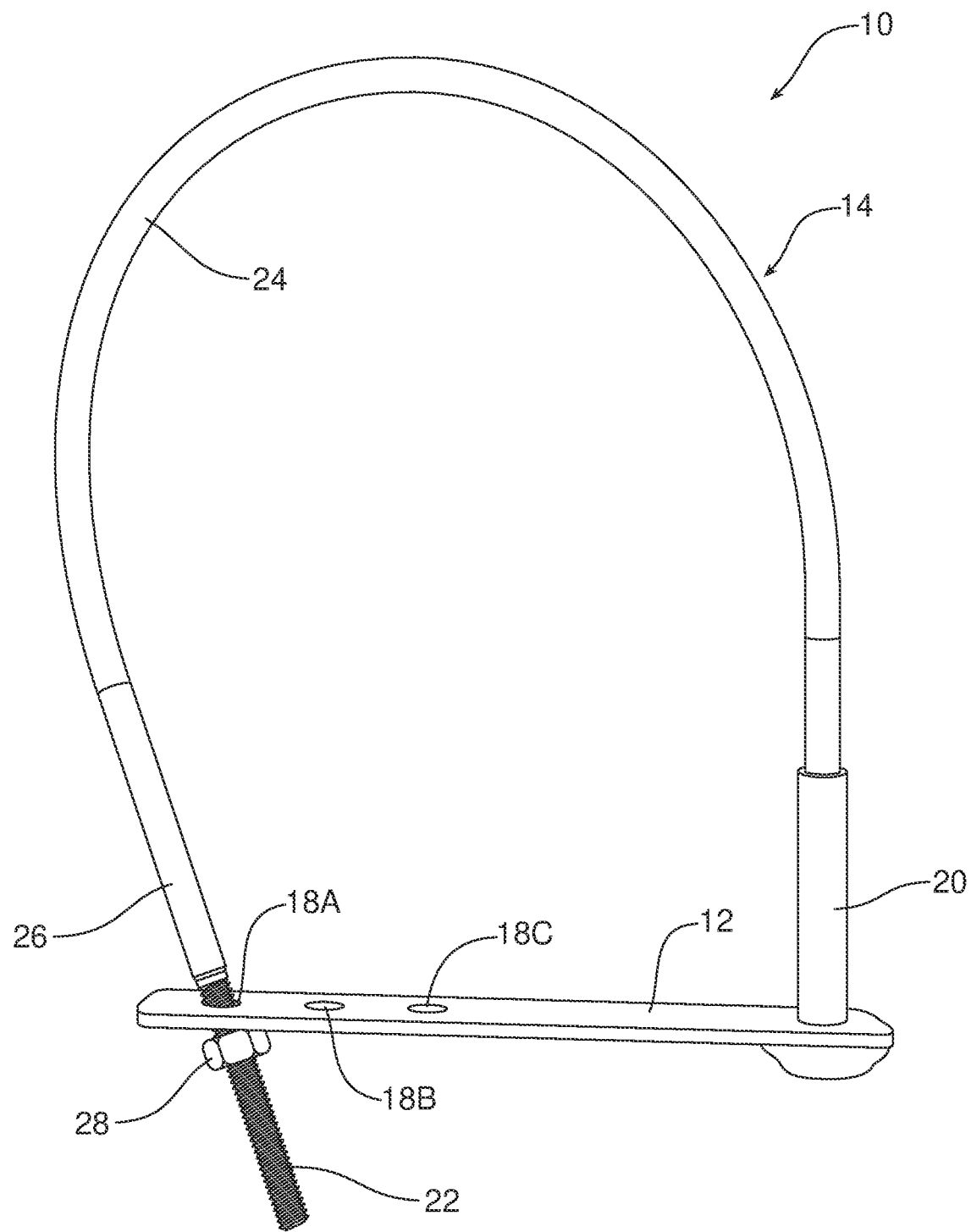
FIG. 2 is a perspective view of an alternative embodiment of the flexible U-bolt assembly wherein the clamping bracket includes a receiver comprising a plurality of spaced apertures.

FIG. 2 illustrates an alternative embodiment for the flexible U-bolt assembly 10 when compared to that shown in FIGS. 1A and 1B. For brevity, reference numbers shared with FIGS. 1A and 1B identify like structures or components of the flexible U-bolt assembly 10. The only difference is that in the embodiment of FIGS. 1A and 1B the receiver 18 comprises a single aperture whereas in the FIG. 2 embodiment the receiver comprises a plurality of spaced apertures 18A-18C. The second end/threaded shank 22 may be secured with the fastener/lock nut 28 in any one of the apertures 18A-18C in order to provide some adjustability when securing the flexible U-bolt assembly 10 around one or more objects.

Figure 3:
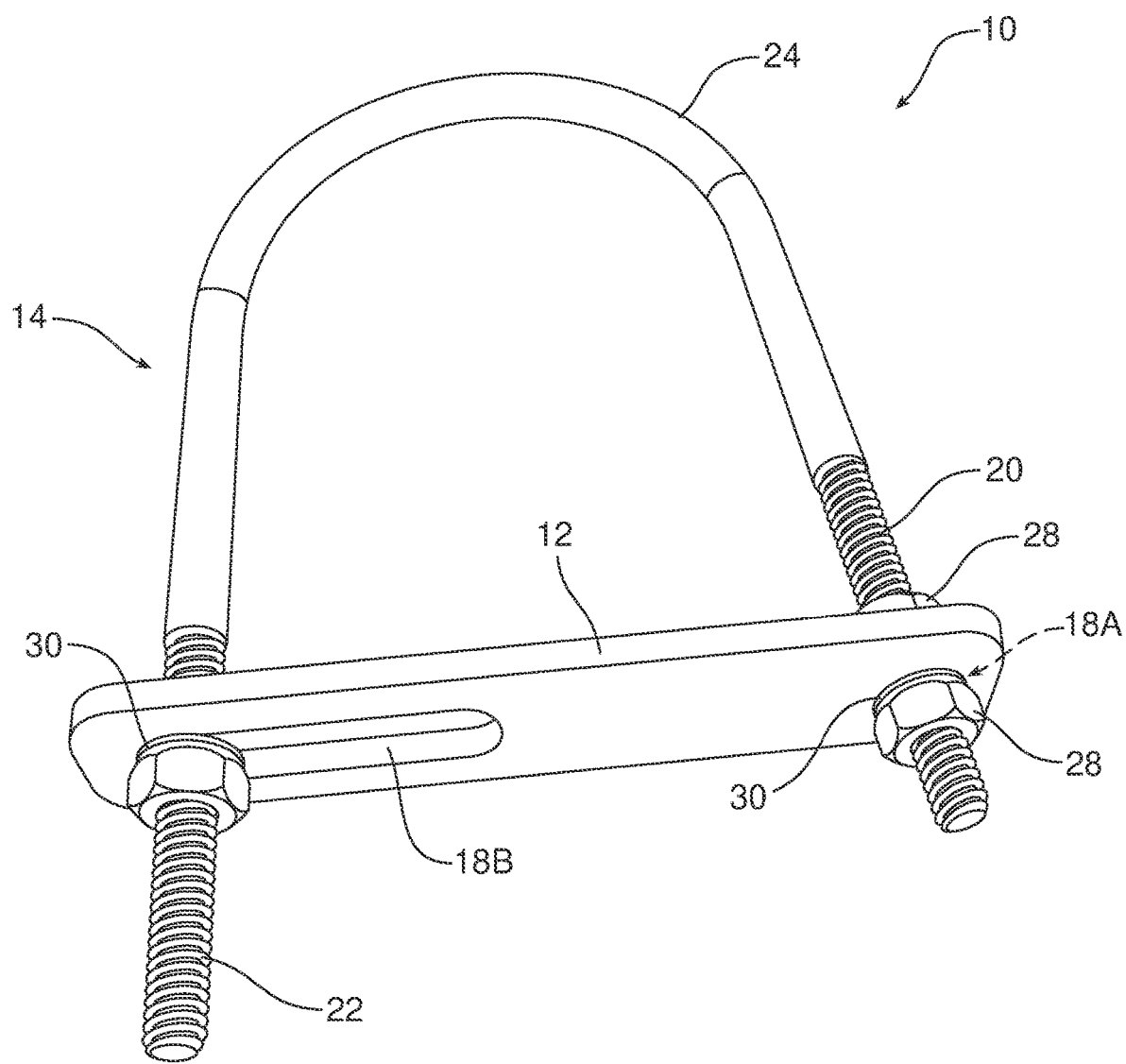
FIG. 3 is a perspective view of yet another alternative embodiment of the flexible U-bolt assembly wherein the first end of the U-bolt is secured in a receiver comprising a single aperture and the second end of the U-bolt is secured in a receiver comprising an elongated slot.

FIG. 3 illustrates yet another possible embodiment of the flexible U-bolt assembly 10 that includes a clamping bracket 14, having a first receiver 18A in the form of a single aperture and a second receiver 18B in the form of an elongated slot. The flexible U-bolt assembly also includes a U-bolt 14 having a first end 20, a second end 22 and a flexible elongated body 24 in the form of a steel cable. When closed, the first end/threaded shank 20 is secured in the first receiver 18A by securing between two fastener/lock nuts 28 that are tightened together to squeeze the clamping bracket 12. The second end/threaded shank 22 is secured in the same manner in the second receiver/elongated slot 18B (second lock nut is hidden from view by the clamping bracket). As illustrated, lock washers 30 may be used to aid in securing the connection.

Figure 3A:
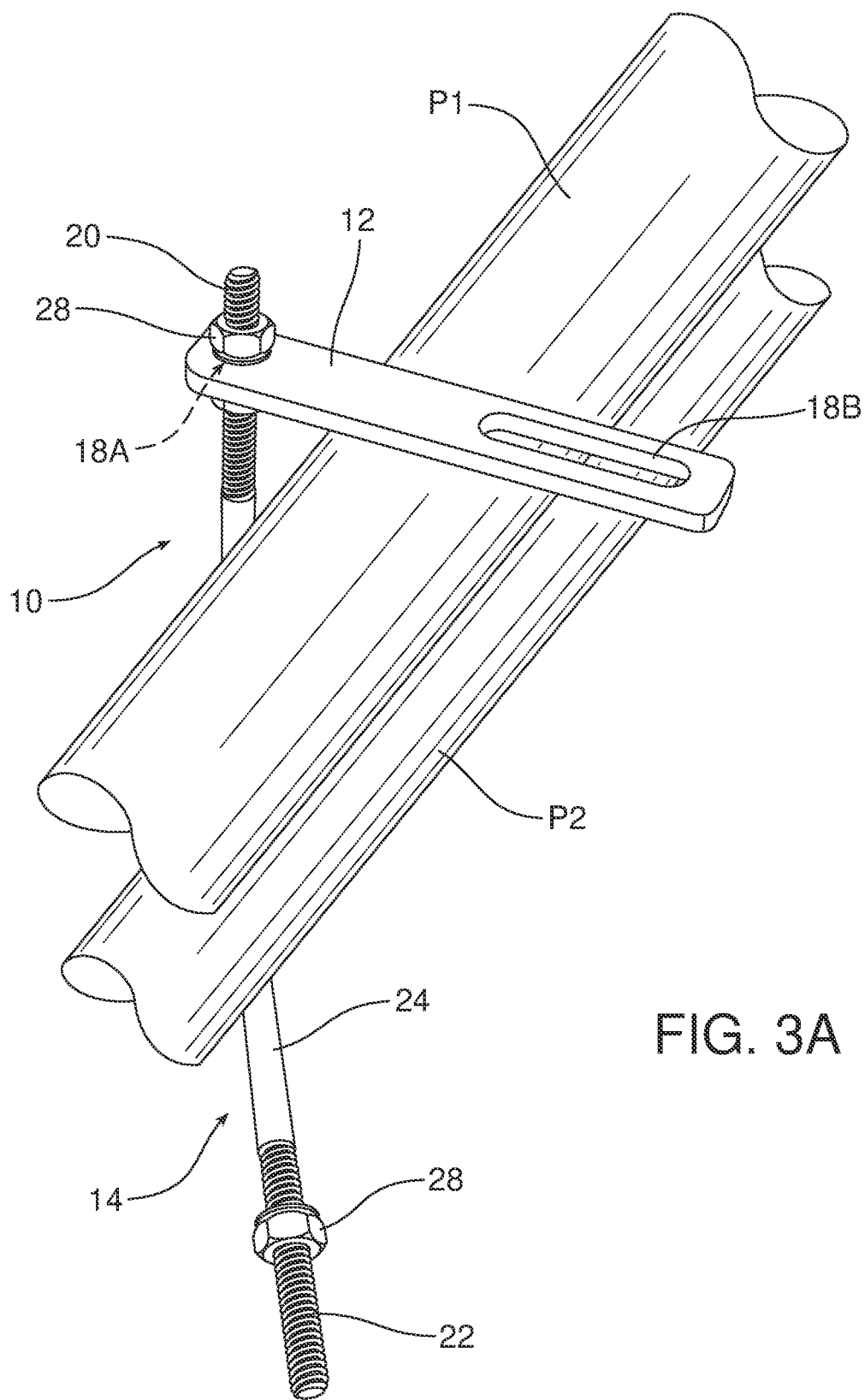
FIGS. 3A-3D are a series of perspective views illustrating how the flexible U-bolt assembly embodiment of FIG. 3 may be used to secure two pipes together.
Figure 3B:
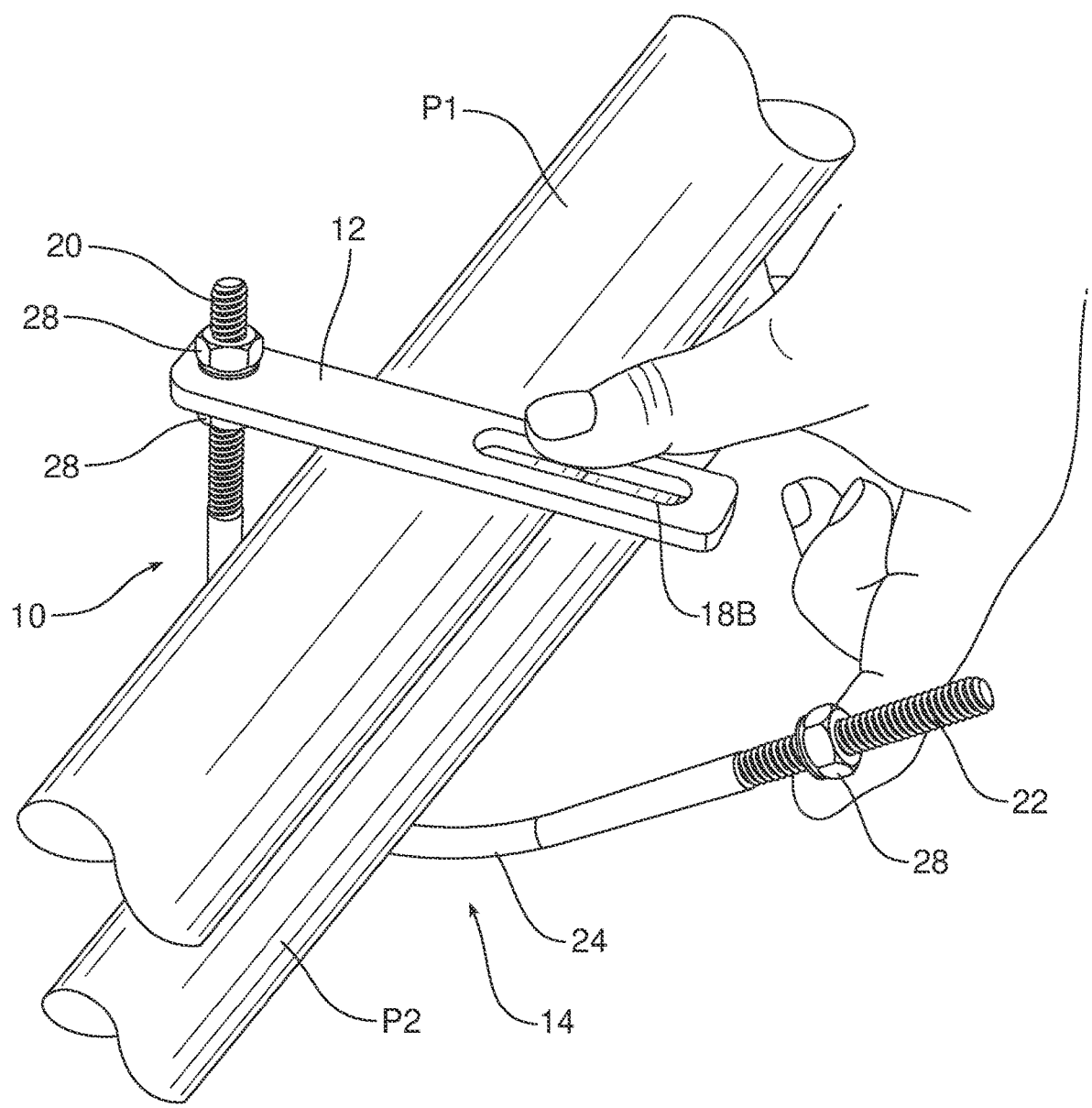
Figure 3C:
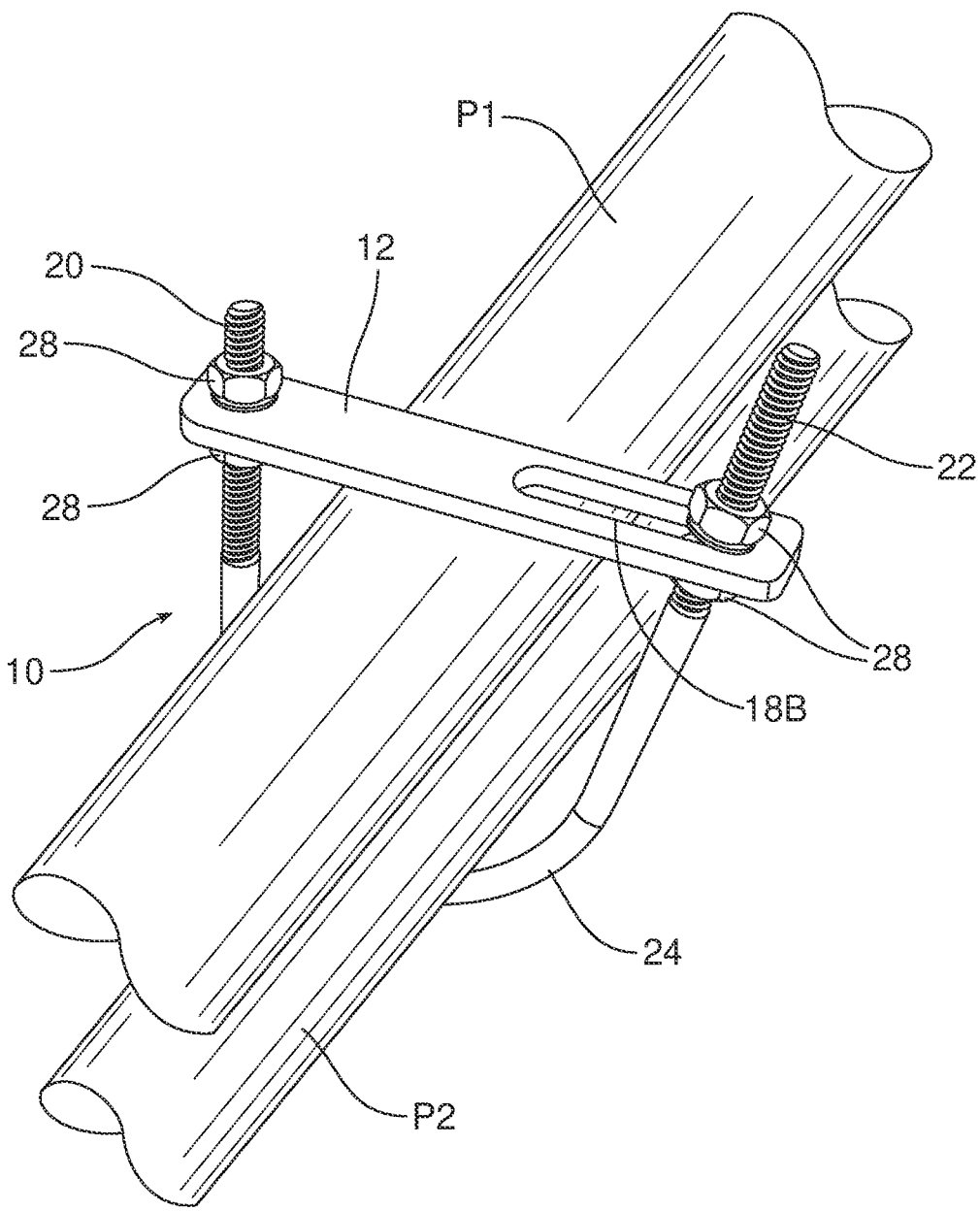
Figure 3D:
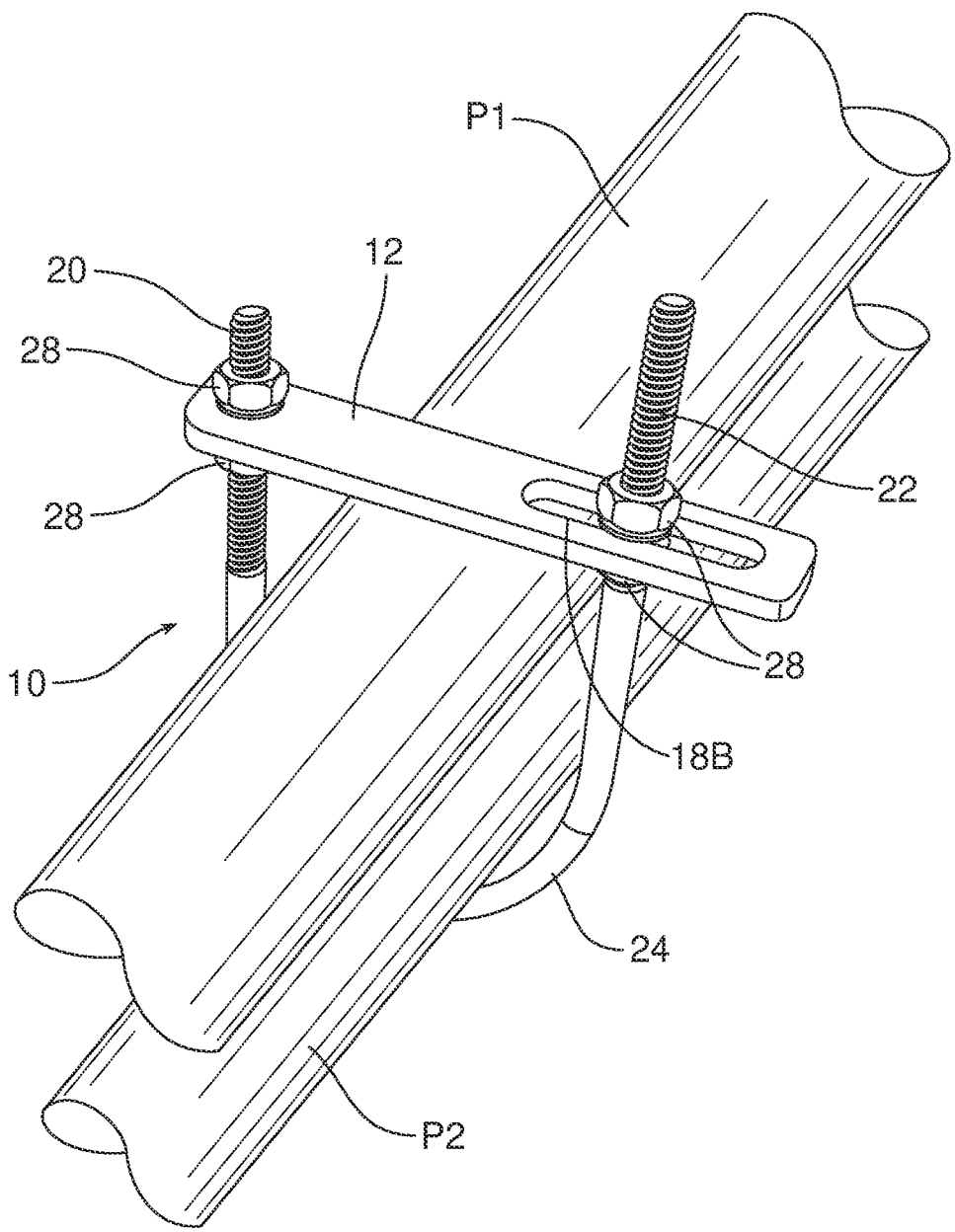

FIGS. 3A-3D illustrate how the U-bolt assembly shown in FIG. 3 may be used to secure two pipes P1 and P2 together. As shown in FIG. 3A, the flexible U-bolt assembly 10, with the first end 20 already tightened in place in the first receiver 18A, is positioned with the clamping bracket 12 against one of the pipes P1. As shown in FIG. 3B, the flexible elongated body 24 is then pulled around the pipes P1 and P2. Next, the second end 22 is inserted in the second receiver/elongated slot (see FIG. 3C) and then the lock nuts 28 are tightened to secure the second end in place (see FIG. 3D).

FIGS. 4A-4C illustrate yet another possible embodiment of the flexible U-bolt assembly 10. In this embodiment, the first end 20 of the U-bolt 14 comprises a threaded shank and the second end 22 of the U-bolt comprises a plurality of spaced connectors 32A, 32B and 32C. The first receiver 18A in the clamping bracket 12 comprises a single aperture and the second receiver 18B in the clamping bracket comprises an elongated slot including an entry aperture 34 and a narrowed neck 36 connecting the entry aperture with a plurality of spaced locking apertures 38A, 38B and 38C.

In use, the first end 20 of the U-bolt 14 is secured in the first receiver 18A by squeezing the clamping bracket 12 between two lock nuts 28 (one hidden from view) threaded to the first end/threaded shank 20. The U-bolt 14 is then positioned around one or more objects (not shown) to be held by the U-bolt assembly 10 and the spaced connector 32A at the second end 22 is aligned with the entry aperture 34 (see FIG. 4A) of the second receiver 18B.

The first connector 32A is then inserted in and pushed through the entry aperture 34 (note action arrow A in FIG. 4B). If one wanted to shorten the effective operating length of the U-bolt 14, the second connector 32B and/or third connector 32C could also be pushed through the entry aperture.

Next, the desired connector (connector 32A in the illustrated embodiment) is shifted through the elongated slot via the neck 36 into the desired locking aperture (locking aperture 38B in the illustrated embodiment) and the lock nuts 28 are manipulated to tighten the U-bolt assembly to the object or objects to be held by the device. Here it should be noted that each connector 32A-32C comprises (a) a shank 40 that is sized to freely pass through the neck 36 and locking apertures 38A-38C of the second receiver/elongated slot 18B and (b) an enlarged head 42 that is sized to pass through the entry aperture 34 and be captured by the smaller locking apertures 38A-38C.

FIG. 5 illustrates yet another embodiment of the U-bolt assembly 10 which includes a U-bolt 14 having a first end/threaded shank 20, a second end/locking ring 22 and a flexible elongated body 24 extending between the first and second ends. As shown, the flexible elongated body 24 may be looped around and the second end/locking ring 22 may be positioned over the first end/threaded shank 20 and locked between two nuts 28 threaded to the first end/threaded shank.

FIGS. 6A and 6B illustrate yet another embodiment of the U-bolt assembly wherein the flexible elongated body 24 includes two sections 24A and 24B. Section 24A is connected to the first end 20 while section 24B is connected to the second end 22. The two section 24A and 24B are connected together by a section connector 50. The connector 50 includes a housing 52 including a channel 54 adapted for receiving the distal or free ends of the two sections. A clamp member 56 is adapted to fit within the sidewall of the housing 52 and close the open side of the channel 54. The cooperating screws 58 and lock nuts 60 are tightened to tightly clamp the ends of the two sections 24A and 24B in the channel 54 between the housing 52 and the clamp member 56 of the connector 50 in a manner that resists slipping of the cable sections. By adjusting the relative position of the two sections 24A and 24B in the connector 50, it is possible to adjust the overall length of the flexible elongated body 24, thereby allowing the U-bolt assembly 10 to be used for a wider variety of applications. It should be appreciated that any embodiment of the flexible U-bolt assembly 10 illustrated in the other drawing figures may incorporate two body sections 24A, 24B and the connector to add this adjustability.

Finally, FIG. 7 illustrates yet another embodiment of the flexible U-bolt assembly 10 wherein the first end 20 comprises a split ring 62 having an entry slot 64 and the second end 22 comprises a connector 66 having a relatively narrow neck 68 and an enlarged head 70. Once again the two ends 20, 22 are connected together by an flexible elongated body 24.

In use, the flexible elongated body 24 is looped around one or more objects or workpieces, the flexible elongated body is pushed through the entry slot 64 into the split ring 62 and the neck 68 is pulled into the split ring 62. Here it should be appreciated that the neck 68 is sized to be held in the split ring 62 but not pull through the entry slot 64 and the enlarged head is sized to not pull through the opening 72 formed in the split ring. This embodiment of the U-bolt assembly 10 makes for a great quick connect/quick disconnect device when hanging an object to an overhead support structure such as a pipe or beam. For example, one could use this device 10 to hang a light from an overhead pipe.

This disclosure may be considered to relate to the following items.

1. A flexible U-bolt assembly, comprising:
   a clamping bracket including a receiver; and
   a U-bolt including (a) a first end fixed to the clamping bracket, (b) a second end adapted for receipt in the receiver and (c) a flexible elongated body extending between the first end and the second end.
2. The flexible U-bolt assembly of item 1, further including a fastener adapted to secure the second end in the receiver.

3. The flexible U-bolt assembly of item 2, wherein the second end includes a threaded shank and the fastener is a lock nut.

4. The flexible U-bolt assembly of any of items 1-3, wherein the receiver is an aperture provided in the clamping bracket.

5 The flexible U-bolt of any of items 1-3, wherein the receiver is a plurality of spaced apertures provided in the clamping bracket.

6. The flexible U-bolt of any of items 1-3, wherein the receiver is an elongated slot provided in the clamping bracket.

7. The flexible U-bolt of any of items 1-3, wherein the receiver is an elongated slot having an entry aperture adapted to receive the second end and a neck portion interconnecting the entry aperture to at least one locking aperture adapted to capture the second end.

8. The flexible U-bolt of item 7, wherein the second end includes a connector having an enlarged head adapted to pass through the entry aperture and be captured in the at least one locking aperture.

9. The flexible U-bolt of item 7, wherein the second end includes a plurality of connectors, each of the plurality of connectors having an enlarged head adapted to pass through the entry aperture and be captured in the at least one locking aperture.

10. The flexible U-bolt of any of items 1-3, wherein the clamping bracket is a rigid steel plate.

11. The flexible U-bolt assembly of any of items 1-3, wherein the flexible elongated body is made from a line, a rope or a cable made from a natural fiber, kenaf, cotton, a plastic material, a composite material, a metal or steel.

12. The flexible U-bolt assembly of any of items 1-3, wherein the flexible elongated body includes a first section and a second section connected together by a section connecter whereby a length of the elongated body may be adjusted.

13. A flexible U-bolt assembly, comprising:
a clamping bracket including a first receiver and a second receiver; and
a U-bolt including (a) a first end adapted for receipt in the first receiver, (b) a second end adapted for receipt in the second receiver and (c) a flexible elongated body extending between the first end and the second end.

14. The flexible U-bolt of item 13, further including a first fastener adapted to secure the first end in the first receiver and a second fastener adapted to secure the second end in the second receiver.

15. The flexible U-bolt assembly of item 14, wherein the first receiver is a first aperture provided in the clamping bracket.

16. The flexible U-bolt assembly of any of items 13-15, wherein the second receiver is a second aperture provided in the clamping bracket.

17. The flexible U-bolt assembly of any of items 13-15, wherein the second receiver is a plurality of spaced apertures provided in the clamping bracket.

18. The flexible U-bolt assembly of any of items 13-15, wherein the second receiver is an elongated slot provided in the clamping bracket.

19. The flexible U-bolt assembly of item 18, wherein the second receiver is an elongated slot having an entry aperture adapted to receive the second end and a neck portion interconnecting the entry aperture to at least one locking aperture adapted to capture the second end.

20. The flexible U-bolt assembly of item 19, wherein the second end includes a connector having an enlarged head adapted to pass through the entry aperture and be captured in the at least one locking aperture.

21. The flexible U-bolt assembly of item 19, wherein the second end includes a plurality of connectors, each of the plurality of connectors having an enlarged head adapted to pass through the entry aperture and be captured in the at least one locking aperture.

22. The flexible U-bolt assembly of any of items 13-15, wherein the flexible elongated body includes a first section and a second section connected together by a section connecter whereby a length of the elongated body may be adjusted.

23. A flexible U-bolt, comprising:
an elongated, flexible elongated body;
a receiver carried on a first end of the elongated body; and
a locking element carried on a second end of the elongated body, the locking element adapted to be received and held by the receiver.

24. The flexible U-bolt of item 23, wherein the first end is a threaded shank and the second end is a ring received over the threaded shank.

25. The flexible U-bolt of item 24, further including a first lock nut for securing the ring to the threaded shank.

26. The flexible U-bolt of item 24, further including a first lock nut and a second lock nut adapted to secure the ring to the threaded shank between the first lock nut and the second lock nut.

27. The flexible U-bolt of item 23, wherein the first end is a split ring having an entry slot and the second end is a connector having a neck and an enlarged head wherein the neck is adapted for receipt in the split ring and the enlarged head is too large to be received in the split ring.

28. The flexible U-bolt of item 27, wherein the elongated flexible elongated body is sized to pass through the entry slot while the neck is too large to pass through the entry slot.

Each of the following terms written in singular grammatical form: "a", "an", and "the", as used herein, means "at least one", or "one or more". Use of the phrase One or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or, unless the context clearly dictates otherwise. For example, the phrases: "a unit", "a device", "an assembly", "a mechanism", "a component, "an element", and "a step or procedure", as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated component(s), feature(s), characteristic(s), parameter(s), integer(s), or step(s), and does not preclude addition of one or more additional component(s), feature(s), characteristic(s), parameter(s), integer(s), step(s), or groups thereof.

The phrase "consisting of", as used herein, is closed-ended and excludes any element, step, or ingredient not specifically mentioned. The phrase "consisting essentially of", as used herein, is a semi-closed term indicating that an item is limited to the components specified and those that do not materially affect the basic and novel characteristic(s) of what is specified.

The foregoing has been presented for purposes of illustration and description. It is not intended to be exhaustive or to limit the embodiments to the precise form disclosed. Obvious modifications and variations are possible in light of the above teachings. For example. The clamping bracket may include substantially any combination of receiver types (e.g. two elongated slots) for holding the first and second ends of the flexible elongated body. All such modifications and variations are within the scope of the appended claims when interpreted in accordance with the breadth to which they are fairly, legally and equitably entitled.

What is claimed:

1. A flexible U-bolt assembly, comprising:
   a clamping bracket including a receiver;
   a U-bolt including (a) a first end permanently fixed to the clamping bracket, (b) a second end adapted for receipt in the receiver and (c) a flexible elongated and notchless body extending between the first end and the second end; and,
   a fastener adapted to secure the second end in the receiver wherein the receiver has (i) an elongated slot, having an entry aperture adapted to receive the second end, and (ii) a neck portion, interconnecting the entry aperture to at least one locking aperture adapted to capture the second end, and wherein the entry aperture is laterally spaced from the at least one locking aperture by the neck portion.

2. The flexible U-bolt of claim 1, wherein the second end includes a connector having an enlarged head adapted to pass through the entry aperture and be captured by the at least one locking aperture.

3. The flexible U-bolt of claim 1, wherein the second end includes a plurality of connectors, each of the plurality of connectors having an enlarged head adapted to pass through the entry aperture and be captured by the at least one locking aperture.

4. The flexible U-bolt of claim 1, wherein the clamping bracket is a rigid steel plate and the flexible elongated body is made from a line, a rope or a cable made from a natural fiber, kenaf, cotton, a plastic material, a composite material, a metal or steel.

5. The flexible U-bolt assembly of claim 1, wherein the flexible elongated body includes a first section and a second section connected together by a section connecter whereby a length of the elongated body may be adjusted.

6. A flexible U-bolt assembly, comprising:
   a clamping bracket including a first receiver and a second receiver; and
   a U-bolt including (a) a first end adapted for receipt in the first receiver, (b) a second end adapted for receipt in the second receiver and (c) a flexible elongated body extending between the first end and the second end wherein the flexible elongated body includes a first section and a second section connected together by a section connecter whereby a length of the flexible elongated body is adjustable, the section connector including (i) a housing having a channel adapted to receive distal ends of the first section and the second section, (ii) a clamp member adapted to fit within a sidewall of the housing and close a side of said channel, and (iii) a cooperating fastener to tighten the housing and the clamp member together about the distal ends.

7. The flexible U-bolt of claim 6, further including a first fastener adapted to secure the first end in the first receiver and a second fastener adapted to secure the second end in the second receiver.

8. The flexible U-bolt assembly of claim 6, wherein the first receiver is a first aperture provided in the clamping bracket.

9. The flexible U-bolt assembly of claim 8, wherein the second receiver is a second aperture provided in the clamping bracket.

10. The flexible U-bolt assembly of claim 8, wherein the second receiver is a plurality of spaced apertures provided in the clamping bracket.

11. The flexible U-bolt assembly of claim 8, wherein the second receiver is an elongated slot provided in the clamping bracket.

12. The flexible U-bolt assembly of claim 11, wherein the elongated slot has an entry aperture adapted to receive the second end and a neck portion interconnecting the entry aperture to at least one locking aperture adapted to capture the second end, wherein the entry aperture is laterally spaced from the at least one locking aperture by the neck portion.

13. The flexible U-bolt assembly of claim 12, wherein the second end includes a connector having an enlarged head adapted to pass through the entry aperture and be captured by the at least one locking aperture.

14. The flexible U-bolt assembly of claim 12, wherein the second end includes a plurality of connectors, each of the plurality of connectors having an enlarged head adapted to pass through the entry aperture and be captured by the at least one locking aperture.

* * * * *